United States Patent
Gerendas et al.

(10) Patent No.: US 9,353,783 B2
(45) Date of Patent: May 31, 2016

(54) AUXETIC LOCKING PIN

(71) Applicant: Rolls-Royce Canada, Ltd., Montreal (CA)

(72) Inventors: Miklos Gerendas, Am Meelensee (DE); Ali Shanian, Montreal (CA); Carl Carson, Montreal (CA)

(73) Assignee: Rolls-Royce Canada, Ltd., Montreal, Quebec (CA)

( * ) Notice: Subject to any disclaimer, the term of this patent is extended or adjusted under 35 U.S.C. 154(b) by 176 days.

(21) Appl. No.: 14/050,293

(22) Filed: Oct. 9, 2013

(65) Prior Publication Data

US 2014/0270936 A1   Sep. 18, 2014

Related U.S. Application Data (60) Provisional application No. 61/792,487, filed on Mar. 15, 2013.

(51) Int. Cl.
| | | |
|---|---|---|
| *F16D 1/08* | (2006.01) | |
| *F16B 19/02* | (2006.01) | |
| *B23P 11/02* | (2006.01) | |
| *F16B 19/00* | (2006.01) | |

(Continued)

(52) U.S. Cl.
CPC ............. *F16B 19/02* (2013.01); *B23P 11/02* (2013.01); *F16B 1/0014* (2013.01); *F16B 19/004* (2013.01); *F16B 2/241* (2013.01); *F16B 2/243* (2013.01); *Y10T 29/49872* (2015.01); *Y10T 403/7047* (2015.01); *Y10T 403/7061* (2015.01); *Y10T 403/75* (2015.01)

(58) Field of Classification Search
CPC ...... F16B 2/243; F16B 19/004; F16B 1/0014; F16B 2/241; F16B 19/02; Y10T 403/7061; Y10T 403/7047; B23P 11/02; F16D 1/0835
See application file for complete search history.

(56) References Cited

U.S. PATENT DOCUMENTS

| | | | |
|---|---|---|---|
| 2,754,716 A | 7/1956 | Bourns | |
| 2,931,412 A * | 4/1960 | Wing | ............................ 411/108 |
| 3,425,311 A | 2/1969 | Levy | |

(Continued)

FOREIGN PATENT DOCUMENTS

| | | |
|---|---|---|
| DE | 102004043144 A1 | 12/2005 |
| JP | H04293606A A | 10/1992 |

(Continued)

OTHER PUBLICATIONS

International Search Report for PCT/US2013/067746 mailed Jan. 27, 2014.

*Primary Examiner* — Michael P Ferguson
*Assistant Examiner* — Matthew R McMahon
(74) *Attorney, Agent, or Firm* — Fishman Stewart PLLC (57) ABSTRACT

An auxetic locking structure can be used as a mechanism for securing two or more members in an assembly or other system. The locking structure has void patterns on its exterior surface which permit the locking structure to reduce its outer diameter upon loading in an axial direction. Once the structure has been sufficiently loaded and the diameter has been sufficiently reduced, the locking structure may be positioned within a bore of an article, the axial load is then reduced, thus causing the locking structure to expand and engage the bore of the article. The locking structure and article are now secured to one another creating an improved assembly.

9 Claims, 5 Drawing Sheets

(51) Int. Cl.
*F16B 1/00* (2006.01)
*F16B 2/24* (2006.01)

(56) References Cited

U.S. PATENT DOCUMENTS

| | | | |
|---|---|---|---|
| 3,527,280 A | 9/1970 | MacNorius | |
| 3,618,443 A | 11/1971 | Kawakami | |
| 4,906,125 A * | 3/1990 | Burstrom | 403/370 |
| 5,069,586 A | 12/1991 | Casey | |
| 5,758,545 A * | 6/1998 | Fevre et al. | 74/493 |
| 7,611,303 B2 * | 11/2009 | Hanrahan et al. | 403/372 |
| 7,922,418 B2 | 4/2011 | Baker et al. | |
| 7,922,419 B2 | 4/2011 | Snadden et al. | |
| 8,021,072 B2 | 9/2011 | Court et al. | |
| 8,034,103 B2 * | 10/2011 | Burriesci et al. | 623/2.36 |
| 8,084,117 B2 * | 12/2011 | Lalvani | 428/136 |
| 8,233,242 B2 | 7/2012 | Court et al. | |
| 8,302,696 B2 * | 11/2012 | Williams et al. | 166/381 |
| 8,317,425 B2 | 11/2012 | Court et al. | |
| 8,652,602 B1 * | 2/2014 | Dolla | 428/36.1 |
| 2007/0213838 A1 * | 9/2007 | Hengelmolen | 623/23.71 |
| 2010/0009120 A1 | 1/2010 | Boyce et al. | |
| 2011/0029063 A1 | 2/2011 | Ma et al. | |
| 2011/0059291 A1 | 3/2011 | Boyce et al. | |
| 2014/0017422 A1 * | 1/2014 | Ma | 428/34.1 |

FOREIGN PATENT DOCUMENTS

| | | |
|---|---|---|
| WO | WO-2005/072649 A1 | 8/2005 |
| WO | WO-2008100901 A1 | 8/2008 |

* cited by examiner

AUXETIC LOCKING PIN

CROSS-REFERENCE TO RELATED APPLICATIONS

This application claims priority to U.S. Provisional Patent Application No. 61/792,487, filed Mar. 15, 2013, the contents of which are hereby incorporated in their entirety.

FIELD OF TECHNOLOGY

A mechanism for securing two members, and more particularly, transformative periodic structures and tunable photonic crystals that may be used as hollow, rolled, spring, or a solid pin.

BACKGROUND

Retaining structures such as pins are used to secure multiple members together so that a combined pinned assembly may be created. Sometimes the combined assembly is to be permanently held together and sometimes it is desirable to disassemble the assembly so that it can be serviced, rebuilt or otherwise repaired. Based upon the design circumstances, it may be difficult to repair certain pinned assemblies due to environmental or physical constraints.

Pins may be constructed of various materials, including but not limited to metal, polymers, rubber and wood. Such pins have been utilized in numerous products and machinery throughout industry and society. Many of the materials that have been utilized to make pins and other retaining structures have been designed to perform under certain predetermined environmental constraints. However, certain environmental conditions are so severe that traditional constructs of pins structures simply cannot operate under such extreme conditions.

A pin typically has a longitudinal axis and a radii that defines a part of the geometry of the pin. The geometry of the pin traditionally has a solid construct which lends itself for use in high shear conditions. Based upon the material used, the pin will have varying compression, shear, tension and elastic characteristics. Irrespective of the material used, virtually all materials undergo a transverse contraction when stretched in one direction and a transverse expansion when compressed. The magnitude of this transverse deformation is governed by a material property known as Poisson's ratio. Poisson's ratio is defined as the transverse strain divided by the axial strain in the direction of stretching force. Since ordinary materials contract laterally when stretched and expand laterally when compressed, Poisson's ratio for such materials is positive. Poisson's ratios, denoted by a Greek nu, n, for various materials are approximately 0.5 for rubbers and for soft biological tissues, 0.45 for lead, 0.33 for aluminum, 0.27 for common steels, 0.1 to 0.4 for cellular solids such as typical polymer foams, and nearly zero for cork.

Negative Poisson's ratios are theoretically permissible but have not been successfully observed in real materials. Specifically, in an isotropic material (a material which does not have a preferred orientation) the allowable range of Poisson's ratio is from −1.0 to +0.5, based on thermodynamic considerations of strain energy in the theory of elasticity (1). It would be helpful to provide a pin structure that exhibits negative Poisson's ratio.

Repairing an assembly that utilizes a pin traditionally requires the pin to be driven out of the aperture in which it resides. This can be accomplished by using a driver to force the pin out to the aperture. However, in some circumstances a manufacturer may not want a consumer to repair such assemblies as doing so may invalidate the warranty, or even impact the integrity of the system in which the pinned assembly is being used. For example, if a manufacturer makes a part and that part should only be serviced by an approved repair technician, then it is difficult to monitor circumstances when the consumer may have attempted to repair the pinned assembly themselves. In some instances the consumer may damage a product by taking the repair into their own hands. As such, it would be helpful to provide a locking pin that has features in place that make it difficult for consumers to repair or take apart a manufactured structure, such as a pinned assembly.

It would also be helpful to provide an improved pin like structure that is made of a process where void configurations are generated in the material directly in a stress free state, whereby the pin like structure can then undergo a loaded condition resulting in a negative Poisson's ratio behavior. Such process could be used to insert a pin structure into a part, but later allow the part to be serviced again by re-loading the pin structure so as to permit the pin to be removed from the part without damaging the part.

BRIEF DESCRIPTION OF THE DRAWINGS

FIGS. 3A-C illustrates a front view of a sheet of material, depicting a void structure at various strain levels;

FIGS. 4 A-C illustrates a front view of another sheet of material, depicting an alternative void structure at various strain levels;

DETAILED DESCRIPTION

In an exemplary embodiment a novel locking pin structure is presented. The pin exhibits a negative Poisson's ratio and is made of a material and construct that reduces its diameter when an axial force is exerted on the longitudinal axis. The material could be a rubber, metal, or others, that easily undergoes shape changes. Another embodiment presents an improved method of inserting an auxetic locking pin into a bore of a structure. The pin may undergo a shape change when axial forces are exerted on the ends of the pin, thus causing the outside diameter of the pin to reduce so as to provide a clearance for the pin to be inserted into the bore of a part. Once the axial force is removed, the diameter of the pin expands thusly engaging the bore of the part causing a locking engagement between the pin and the part.

Another exemplary embodiment includes a locking pin that could be made of a hollow structure with specific void structures in its surface. The void shapes or structures could be generated in the material directly while it is in a stress-free state, equivalent to collapsed void shapes found in rubber under external load in order to get negative Poisson's ratio behavior in metal without collapsing a metallic structure in manufacturing. The void's shapes could be generated in a thick-walled hollow cylinder of the intended size of the pin or the pin can be rolled from sheet metal, in which prior to rolling a void structure has been generated. It will be appreciated that the concepts and void structures that are shown may be employed in areas apart from pins, including but not limited to, combustors, seals, blade tracks, or any components whose functions include maintaining a pressure differential or metering air flow.

Figure 1:
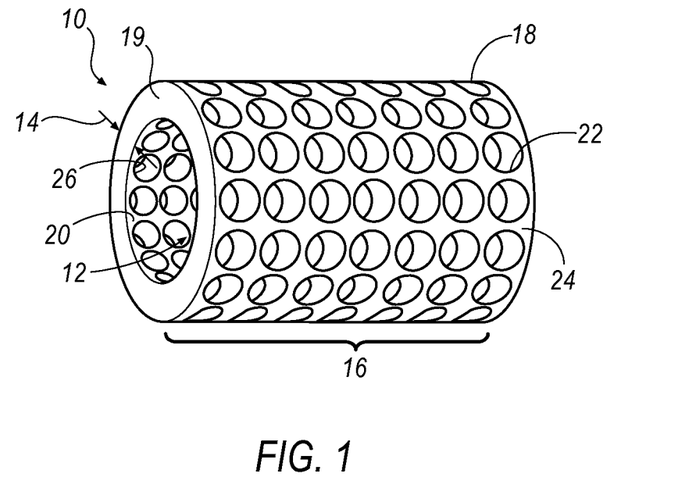
FIG. 1 illustrates a perspective view of a locking pin, in an unloaded state.

FIG. 1 illustrates an auxetic locking pin 10 that is substantially tubular in shape having a hollow core 12, a thickness 14, a length 16, an outer diameter 18, an inner diameter 20 and a plurality of surface configurations or voids 22. The locking pin 10 may be made of rubber, metal, or other material, as is desired for the particular application to which it may be employed. The locking pin 10 is shown in a relaxed, unloaded state, in FIG. 1.

Figure 9:
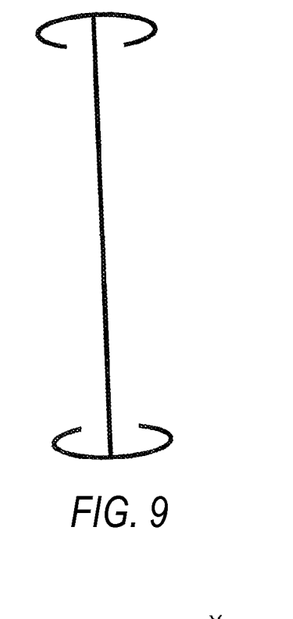
FIG. 9 illustrates an alternative shape for the void structure shown in FIG. 3, in which the void structures are in a "double-T" configuration.

The surface configurations 22, as depicted in FIG. 1, are shown primarily circular in configuration. In an alternative arrangement, the surface configurations are in a "double-T" shape, as shown in FIG. 9. In this configuration, the void configurations have a slot with two ends, and a rounded arc disposed on each end of the slot. It will be appreciated that other geometric configurations can be employed.

The configurations 22 represent apertures that extend through the thickness 14 of the pin 10. The outer diameter 18 of the pin 10 has configurations that are, in one exemplary embodiment, substantially circular shaped while the inside diameter 20 has a shape 26 that is oval in geometric configuration. The configurations 22 were placed in the surface 24 of the outside diameter 18 while the material forming the pin 10 was in a relaxed, unloaded state. FIG. 1 illustrates a flat sheet of material 40 (FIG. 3) having a width 16 that may be rolled and the ends welded or otherwise fixed to form the tubular shaped-pin structure assembly that is shown in FIG. 1.

An exemplary configuration 22 includes patterns that consists of horizontal and vertical ellipses arranged on horizontal and vertical symmetry lines in a way that the lines are equally spaced in both dimensions (also $\Delta x = \Delta y$). The center of the ellipses are on the crossing point of the symmetry lines, and vertical and horizontal slots alternate on the vertical and horizontal symmetry lines and any vertical slots are surrounded by horizontal slots along the lines (and vice versa) and the next vertical slots are found on both diagonals. See FIG. 3.

Figure 10:
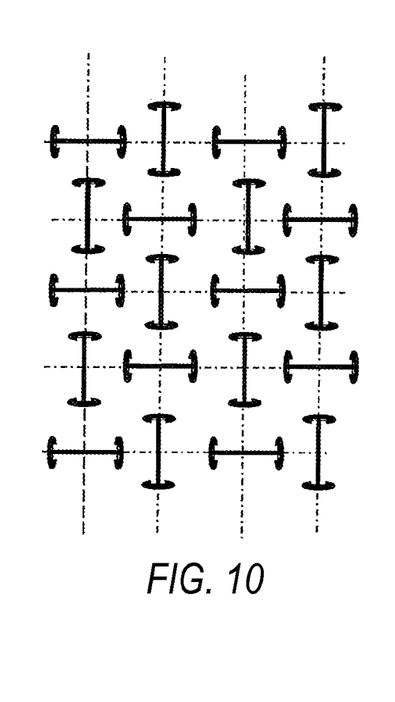
FIG. 10 illustrates a material having void structures in a "double-T" configuration, as shown in FIG. 9, and where the placement and configuration of the void structures allows the material to exhibit auxetic properties with areas of minimal stress.

In an alternative arrangement, patterns of horizontal and vertical "double-T" void configurations are disposed on horizontal and vertical symmetry lines in a way that the lines are equally spaced in both dimensions, as shown in FIG. 10. Similarly to the configuration shown in FIG. 3, the centers of the "double-T" void configurations are on the crossing points of the symmetry lines, and vertical and horizontal "double-T" void configurations alternate on the vertical and horizontal symmetry lines. Any vertical "double-T" void configuration is surrounded by horizontal "double-T" void configurations along both the vertical and the horizontal symmetry lines.

An ellipse pattern on the outside diameter 18 of the cylindrical component is equivalent to the pattern on the sheet (vertical=axial, horizontal=circumferential). But the ellipse shape on the inside diameter 20 is different due to the different radius of this surface. Axial ellipses have a smaller short axis than on the outside but a larger long axis. Circumferential ellipses have a larger short axis than on the outside but a shorter long axis.

Figure 11:
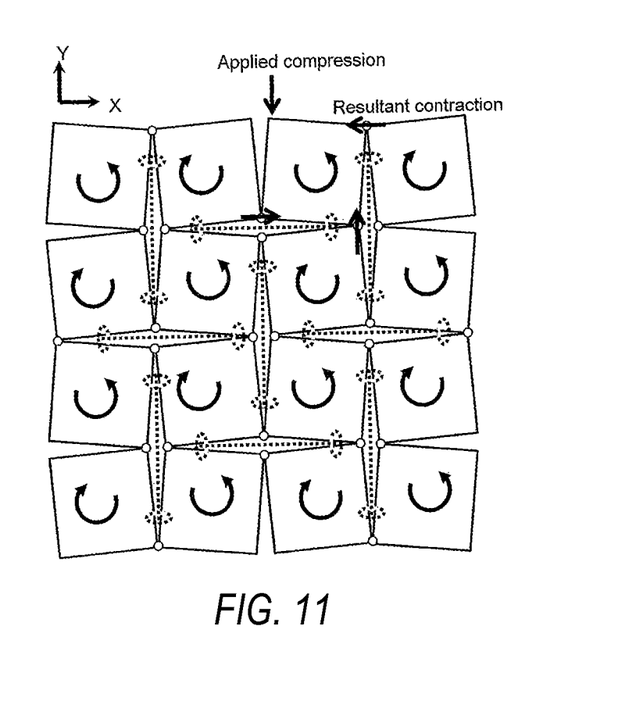
FIG. 11 illustrates a material having the configuration of "double-T" void structures as shown in FIG. 10, showing the forces acting on the material when compression is applied.

The material structure illustrated in FIG. 11 exhibits auxetic properties. FIG. 11 shows the distribution of the void structures. As shown in FIG. 11, the void structures are in a "double-T" configuration, but other configurations could be used. The circular arrows in FIG. 11 illustrate the forces that act within the material when a compressive force is applied. As can be seen, the material will compress, not only in the direction of the applied force, but also in a direction perpendicular to the applied force.

Similarly to the material illustrated in FIG. 11, the pin 10 has an advantageous behavior of an appeared (macroscopic) negative Poisson's ratio. The structure of the pin 10 can be made to contract in lateral direction when it is put under axial compression load, without the metal it is made from, having a negative Poisson's ratio. The behavior is triggered by the void structures 22, as illustrated in FIG. 11.

Figure 2:
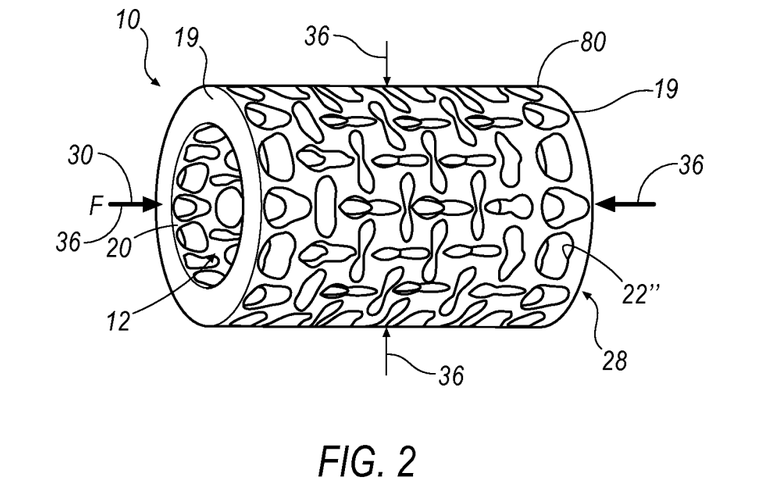
FIG. 2 illustrates a perspective view of a locking pin, in a loaded state.

FIG. 2 illustrates the FIG. 1 auxetic locking pin 10 in a loaded state 28. Loading the locking pin 10 can be effectuated by applying an axial force 30 in the direction of inwardly pointing arrows 36 which causes an inwardly depending force F to be exerted on the distally opposed ends 19. The exemplary embodiment shown in FIG. 2 shows an auxetic locking pin 10 having a hole configuration 22" that is different than configuration 22 shown in FIG. 1. The hole configuration 22" is but one of many different void structure configurations that could be employed.

As the axial force 30 is applied to the locking pin 10, the geometric configuration or structure of the locking pin 10 reacts negatively by causing the surface of the outer diameter 80 of the pin 10 to move inwardly in the direction of arrows 36. Thus, an inwardly depending force 30, causes the outer diameter 80 of locking pin 10 to move inwardly in the direction of arrows 36. The reduction of the outer diameter 80 extends uniformly the entire length 16 of the pin 10. The greater the axial force 30 that impinges upon the ends 19, the higher degree of inward defamation of the diameter 80. They are somewhat directly proportional. The hole configurations 22" are voids in the pin structure that react under pressure to cause a negative Poisson's ratio like performance of the pin 10.

Figure 3A:
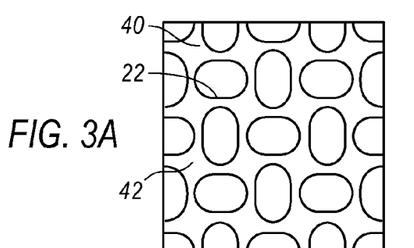
Figure 3B:
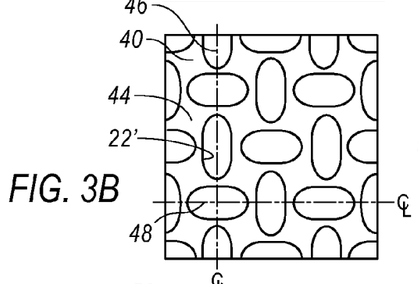
Figure 3C:
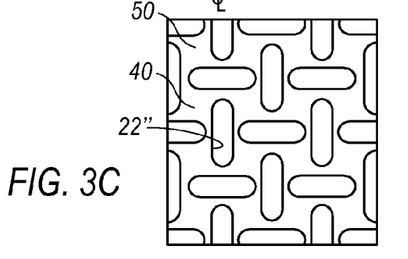

FIG. 3 illustrates a sample of base material 40 that could be employed to manufacture the auxetic locking pin 10 shown in FIG. 1. The material 40 could be comprised of a sheet of material that had voids 22 stamped therein while the sheet was in its relaxed state. The material could be rubber, foam, metal, or some other material. The apertures or voids 22 that are shown in the surface of the sheet of material 40, are formed via stamping, or some other manufacturing process. After the voids 22 have been placed into the sheet 40, the sheet could undergo a roll forming, or some other process, in order to form the tubular shaped locking pin structure 10 that is depicted in FIG. 1. Once the sheet has been placed in its tubular-shaped configuration, any remaining seam may be bonded, welded, or otherwise fixed so as to create a seamless pin like construct.

FIG. 3 illustrates the sheet of material 40 having gone through three different stages of stressed conditions. Each such stage represents a potential event where the configurations or voids 22 take on a slightly different configuration as a load is applied to the pin 10. The first step depicts a sheet of material 40 when in an unstrained condition 42 where the sheet 40 of material is primarily unloaded. This is when no axial force F has been applied to the ends 19 of the pin 10.

Step 2 illustrates a stage 44 where the sheet 40 of material has been strained, thus causing the oval structure 22' to become oblong along a vertical axis 46, while becoming narrowed and shortened along the x axis 48. As the sheet 40 of material becomes more stressed, that is a greater axial force 30 is applied, the oval structures 22 become more disfigured, resulting in the locking pin 10 transforming into a different geometric configuration. At this step the diameter 80 of the pin 10 begins to reduce as the auxetic structure permits a reduction in diameter as the force 30 is applied inwardly.

Finally, with continued reference to FIG. 3, another step 50 occurs as inwardly applied axial force 30 continues to be exerted on the auxetic locking pin 10. At this step the sheet 40 of material has its oval shaped structures 22" taking on an even more extreme oval geometric configuration where the x axis 48 continues to be shortened, while the y axis 46 continues to elongate. This process may continue until a maximum negative strain level is reached, thus resulting in a minimum diameter 80 being obtained. See FIG. 2.

Figure 5:
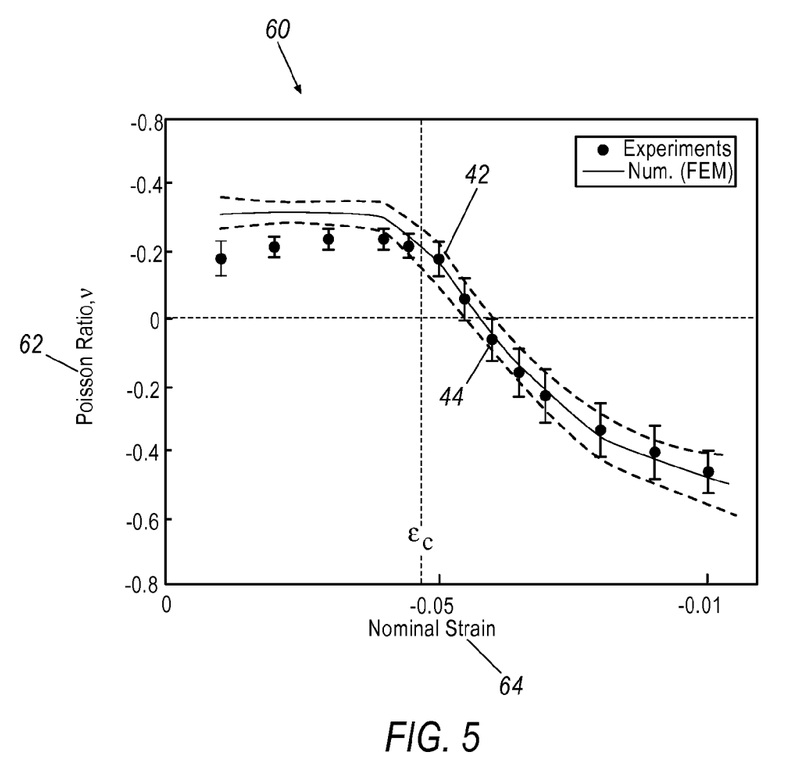
FIG. 5 illustrates a graph depicting the Poisson's ratio versus normal strain, for the exemplary locking pin.

FIG. 5 illustrates a strain graph 60 that plots the Poisson's ratio 62 on the y axis, relative to the normal strain 64 on the x axis. This graph depicts the relationship of force 30 being applied to the auxetic pin 10. For example, with continued reference to FIGS. 3 and 5, at step 1 (42), the sheet 40 may initially take on a slightly positive Poisson's ratio of approximately 0.2. However, as an axial force 30 continues to be applied to the auxetic pin 10, the sheet 40 begins to transform the structure to have a negative Poisson's ratio, such as that depicted at step 2 (44) where approximately a –0.1 Poisson's ratio is depicted. This is represented by step 2 (44), of FIG. 3. At this step, the diameter 80 of the locking pin 10 begins to contract in the direction of arrows 36.

Finally, as an axial force 30 is continued to be applied to the end 19 of the locking pin 10, the diameter 80 continues to contract. The void structures at this stage have an elongated configuration 22" as is shown in step 3 (50) (FIG. 3). By applying the axial force 30 the pin 10 reduces its diameter which may be helpful to load a locking pin 10 into a part.

Figure 4A:
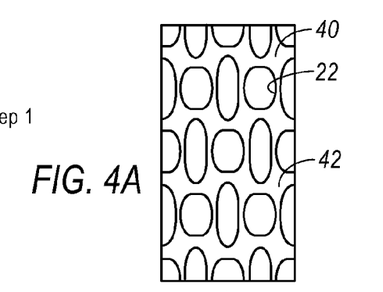
Figure 4B:
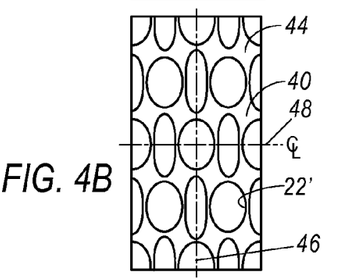
Figure 4C:
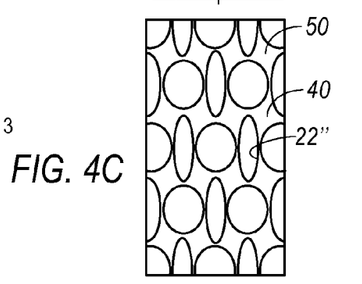

FIG. 4 illustrates an alternative pattern arrangement whereby a sheet 40 of material includes a plurality of holes or voids 22 and its surface. The sheet 40 is shown in an unstressed state at first step 42. It will be appreciated that other geometric configurations 22, apart from that which is shown in FIGS. 3 and 4, are contemplated.

With continued reference to FIG. 4, at step 2 (44) the pin 10 has had a force 30 applied to the end 19 of the pin. This causes the geometric configuration 22' to deform as it contracts along the longitudinal x axis 48, and expands along the y axis 46.

As force 30 continues to be exerted on the end 19 of the pin 10, the sheet 40 of material continues to have its void structures deform. This is shown in step 3 (50) where the material 40 is stressed even further, and the geometric configurations 22" have been further transfigured where the oval shaped openings continue to contract along the x axis 48 and elongate along the y axis 46.

It will be appreciated that the auxetic locking pin 10 as illustrated in FIGS. 1 and 2, can have various thicknesses 14, lengths 16, outside diameters 18, or inside diameters 20. Each of which may employ an auxetic structure that is operable to have its structure operate such that when a force is applied on an end 19 of the pin 10, the diameter 18 contracts, thus allowing the auxetic pin 10 to be loaded into another structure. Applications for this unique concept can be used in industries where it desirable to insert a pin into a boar of an article.

An exemplary method of manufacturing an auxetic locking pin 10 will be presented. First a sheet 40 of material is provided having a thickness 14 and a length 16. It may be made of metal, rubber or other material. Next, while the sheet remains in a relaxed state, apertures 22 are stamped or otherwise placed through the thickness 14 of the material 40. One exemplary pattern is to have alternating shapes along the x axis. One such non-limiting example is to provide an oval shaped pattern where ovals are placed in alternating patterns, such as that shown in FIG. 3. Other shapes or void structures are contemplated, including, but not limited to, S-shaped, hook-shaped, J-shaped, and dumbbell-shaped.

The next step is to roll the sheet 40 of material into a tubular shape as shown in FIG. 1. This step creates a pin 10 that has a bore 20 that extends the axial length 16 of the pin 10. A seam may remain that can be bonded, welded or affixed via other means. Other finishing steps may be employed to complete the exterior surface of the pin. The pin 10 is now ready to be inserted in a part.

Figure 6:
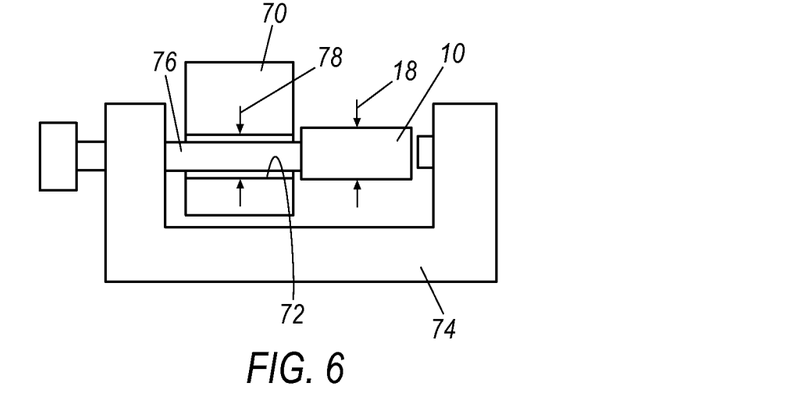
FIG. 6 illustrates side view of a locking pin installed in a fixture, and the pin is in an unloaded state.
Figure 7:
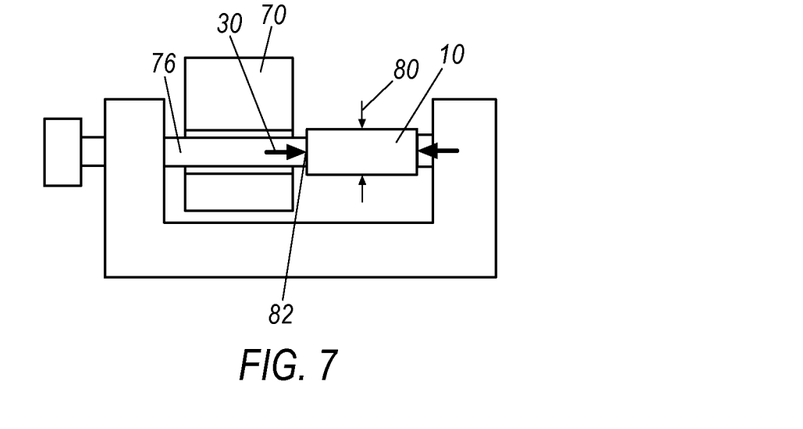
FIG. 7 illustrates a side view of a locking pin installed in a fixture, and the pin is under load in the axial direction.
Figure 8:
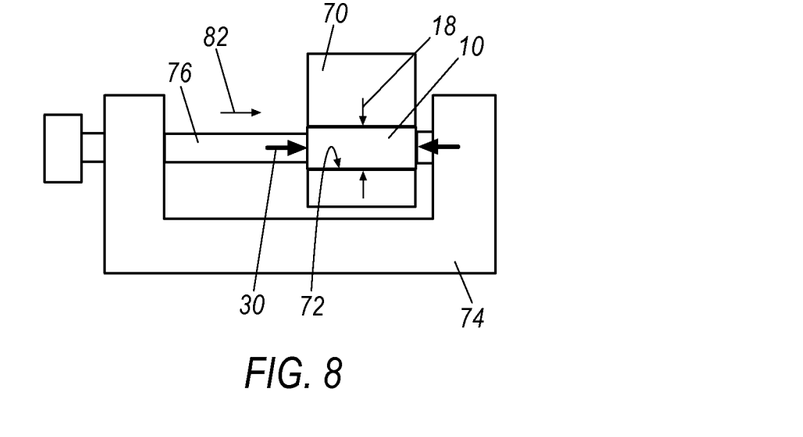
FIG. 8 illustrates a side view of a locking pin, in a loaded state and being inserted a bore of a structure.

FIGS. 6-8 depict one possible methodology that could be employed for installing an auxetic locking pin 10 into a part 70. The part 70 could be a device, article, or other structure that needs a pin, barring, shaft, or the like inserted within the part 70. The part 70 may have a bore 72 that extends the axial length of the part 70. A fixture or tool 74 may be provided to enhance the process of installing a locking pin 10 into the part 70. FIG. 6 illustrates a first step in this process where the part 70 has been loaded onto the shaft 76 of the tool 74. Once loaded, the part 70 is provided with an inside diameter 78 which is operable to receive a locking pin 10. The locking pin 10 is shown loaded into the fixture 74 where the end of the shaft 76 impinges upon an end 19 of the locking pin 10. The locking pin at this stage has a diameter 18, which is unloaded.

FIG. 7 illustrates a force 30 being applied by the shaft 76 which results in a load being applied to the locking pin 10. At this step the diameter 18 of the locking pin 10 begins to contract to where it has a new diameter 80. The diameter 80 is smaller than the diameter 18. As the force 30 continues to impinge upon the end 19 of the locking pin 10, the diameter 80 continues to decrease. This continues until the diameter 80 is less than the inside diameter 72, of the part 70. It would be helpful to provide a diameter 80 that is sufficiently less than the diameter 78 of the part 70, so as to allow a clearance therebetween.

FIG. 8 illustrates the pin 10 with its diameter 80 held constant while the part 70 is slid axially in the direction of arrow 82 (FIG. 7). The force 30 continues to be maintained on the locking pin 10, during this step. The part 70 is slid in the direction of arrow 82 until it reaches a point where the pin 10 is centrally located within the bore 72 of the part 70.

Once the pin 10 has been fully inserted to the bore 72 of the part 70, the shaft 76 of the fixture 74 is retracted in the direction opposite of arrow 82. This allows the locking pin 10 to relax and revert back to its larger diameter 18, or a size similar thereto. Once the locking pin 10 reverts back towards its diameter 18, it becomes compressed with the bore 72, thus causing an interference fit between the outer diameter 18 of the locking pin 10, and the bore 72 of the part 70. This interference fit creates a locking engagement, thus firmly securing the pin 10 relative to the part 70. Due to the larger overlap with the bore, the pin is more securely locked in place. The additional edges 24 from the void structure 22 lead to an additional "keying" with the bore 72. This creates a locking engagement between the pin 10 and the part 70. The locking engagement can be unlocked by reversing the aforementioned steps. The pin 10 does not get loose due to external load or vibrations.

The reverse steps may be employed in order to remove the locking pin 10, from the part 70. A force 30 could be applied until the structure of the locking pin 10 begins to transform, thus causing the diameter 18 to decrease. Once the diameter sufficiently decreases, it has a new diameter 80 which results in a clearance between outer diameter 80 and the bore 72 of the part 70. The pin 10 can then be removed from the part 70.

With reference to FIG. 7, the part 70 has been separated from the pin 10. The pin 10 may be removed from the fixture 74, thus allowing the part 70 to be rebuilt. Likewise, in the event the pin 10 needs to be serviced, the aforementioned steps may be employed to provide a new, or refurbished, pin 10 into a part 70. Thus, the present method and structure provides for a serviceable part 70 where a new or refurbished pin 10 can be inserted into the part 70. The present embodiment may be employed in other applications, beyond that disclosed herein, where it is desirable to provide a locking pin 10, or the like, into a bore of a structure.

One of the features of an embodiment disclosed herein is that an untrained person, who does not know about the specific properties of the pin 10, cannot remove the pin 10 without significant damage to the bore 72, which can be checked for by an OEM during overhaul. If authorized personnel needs to remove the pin 10, then they can apply the process mentioned above to first compress the pin 10 and then while in the compressed state, slide the pin 10 out without any damage to the bore 72. This specific property allows the OEM to discover unauthorized manipulation (witness pin), or the OEM can use the pin at a vibration level not bearable for conventional pins in the past.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modification and changes can be made to these embodiments without departing from the scope of the present disclosure as set forth in the claims. The specification and the drawings are to be regarded as an illustrative thought instead of merely restrictive thought.

What is claimed is:

1. A hollow pin comprising:
    a hollow body having an outside surface, a thickness, a length, two axial ends, and an axially extending internal bore, the hollow body having an outside diameter that is substantially circular shaped and an inside diameter, and the hollow body defining a plurality of voids extending through the thickness of the hollow body from the outside diameter to the inside diameter;
    wherein the plurality of voids have an ellipse pattern having an ellipse shape that is different on the outside diameter than on the inside diameter;
    wherein the ellipse pattern includes axial ellipses and circumferential ellipses, and wherein the axial ellipses each have a smaller short axis and larger long axis on the inside diameter than on the outside diameter, and the circumferential ellipses each have a larger short axis and a shorter long axis on the inside diameter than on the outside diameter;
    wherein said plurality of voids are distributed over the entire circumference of the hollow body for the entire axial length of the hollow body; and
    wherein the plurality of voids provide the hollow body with auxetic properties, such that a compressive axial load applied to the axial ends causes lateral contraction of the outside diameter of the hollow body towards an axis of the internal bore.

2. The pin as claimed in claim 1, wherein the outside diameter of the hollow body reduces proportionally as the axial load is applied to the ends of the hollow body.

3. The pin as claimed in claim 1, wherein the plurality of voids includes a first void having a first shape extending along a lateral axis, and a second void having a second shape the same as the first shape in an adjacent area that is rotated by approximately 90 degrees relative to the first void.

4. The pin as claimed in claim 1, wherein the internal bore is operable to slideably receive a shaft.

5. The pin as claimed in claim 1, wherein the plurality of voids on the outside surface of the hollow body have edges configured to grip a bore of a part in which the pin is inserted.

6. The pin as claimed in claim 1, wherein the hollow body is made of sheet metal.

7. The pin as claimed in claim 1, wherein the plurality of voids in the hollow body are made during a stress free state.

8. The pin as claimed in claim 1, wherein the hollow body is formed by a rolling process.

9. The pin as claimed in claim 1, wherein the inside diameter of the hollow body has a shape that is oval in geometric configuration.

* * * * *